Dec. 2, 1941.   R. E. MARBURY   2,264,995
CAPACITOR MOTOR FOR LOW TEMPERATURE OPERATION
Filed Sept. 9, 1939
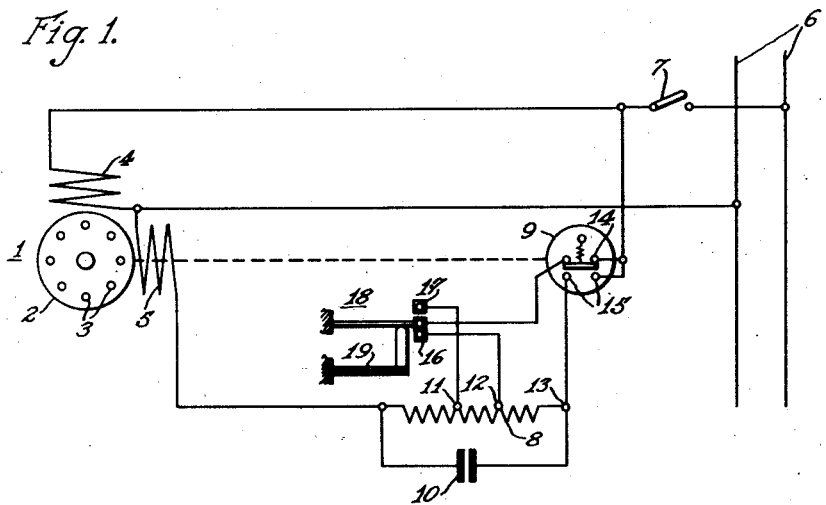
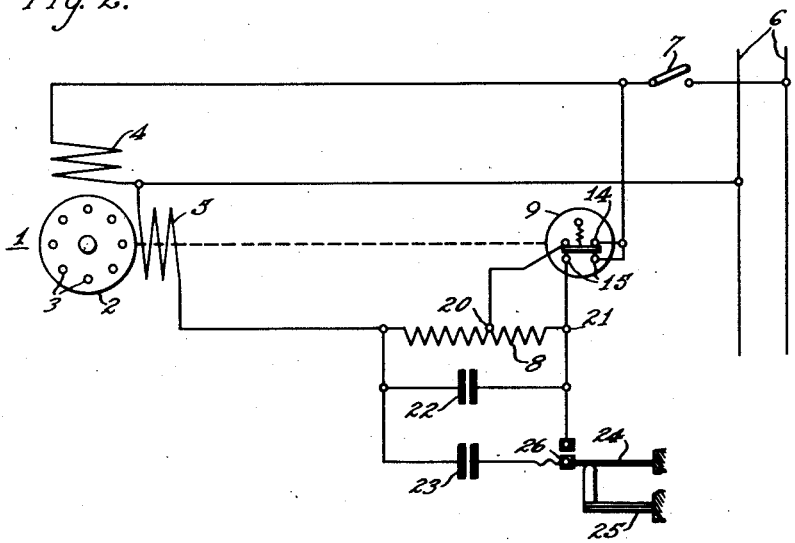
WITNESSES:
C. F. Oberhein
F. P. Lyle
INVENTOR
Ralph E. Marbury.
BY
O. B. Buchanan
ATTORNEY Patented Dec. 2, 1941

2,264,995

UNITED STATES PATENT OFFICE 2,264,995

CAPACITOR MOTOR FOR LOW TEMPERATURE OPERATION

Ralph E. Marbury, Wilkinsburg, Pa., assignor to Westinghouse Electric & Manufacturing Company, East Pittsburgh, Pa., a corporation of Pennsylvania Application September 9, 1939, Serial No. 294,065

10 Claims. (Cl. 172—279)

The present invention relates to capacitor motors, and more particularly to capacitor motors which are intended for intermittent or occasional service in locations where they may be exposed to low ambient temperatures.

Single-phase capacitor motors have a main primary winding which is connected directly to the line, and an auxiliary primary winding which is displaced from the main winding on the stator frame of the machine and connected to the line through a capacitor which is usually in series with the winding. The capacitor causes a phase displacement between the currents in the main and auxiliary windings and, since they are displaced spatially from each other on the frame of the motor, a starting torque is produced and the motor operates essentially as a two-phase motor. There are several types of such motors, in some of which the auxiliary or capacitor winding is disconnected from the line after the motor has come up to speed, while in others the winding remains energized and the effective value of capacitance in the motor circuit is changed for running, either by changing the voltage applied to it by means of an auto-transformer, or by changing the actual value of capacitance. A centrifugal or other type of speed responsive switch is usually used for changing the connections from the starting to the running condition. In all the different types of capacitor motors, however, satisfactory operation of the motor, and particularly the starting performance, is dependent to a large degree upon provision of the correct value of capicitance in the circuit of the auxiliary winding.

In the past, capacitors such as are used with capacitor motors have usually used mineral oil as an impregnating and dielectric material, but in recent years improved types of impregnating liquids have been developed, such as chlorinated diphenyl, which have higher dielectric constants than oil and which are non-inflammable so that a serious fire hazard is avoided. The higher dielectric constant of these liquids is due in large part to polar rotation of the molecules, which is a function of the viscosity of the liquid. When the temperature of the liquid falls below a certain point, the viscosity increases sufficiently to interfere with the polar rotation and the dielectric constant begins to decrease. As the temperature falls below this value, the rotation of the molecules is progressively slowed down until a temperature is reached at which the rotation ceases, after which the dielectric constant remains substantially constant at a value approximately equal to that of oil. Obviously, if the temperature of a capacitor using a dielectric liquid of this type falls below the temperature at which the dielectric constant of the liquid begins to decrease, the capacitance of the capacitor will also decrease.

For applications in which the capacitor is more or less continuously energized with alternating current, the dielectric losses in the capacitor, although they are quite small, will generate sufficient heat to keep the temperature of the dielectric liquid in the range in which free rotation of the molecules is possible, so that the capacitance will not be substantially affected even by very low ambient temperatures. When the capacitor is energized only intermittently, however, if the periods during which it is deenergized are long enough to allow the dielectric liquid to cool down to approximately the ambient temperature, the capacitance will be affected if the ambient temperature is low, and it has been necessary to use oil capacitors with their inferior characteristics. One such application of considerable importance is that of capacitor motors for outdoor installation in locations where low ambient temperatures, such as 25° F. or less, are to be expected. It has not been possible to use capacitors with chlorinated diphenyl or similar dielectrics with such motors when they are to be operated only occasionally or at long intervals because of the decrease in capacitance at low temperatures, which seriously affects the operation of the motor, and in some cases might even cause damage to the motor.

The object of the present invention is to provide a capacitor motor having a capacitor which is subject to decrease in capacitance at low ambient temperatures in which the effective capacitance in the circuit of the capacitor winding may be kept at substantially the desired value irrespective of the temperature.

More specifically, the object of the invention is to provide a capacitor motor having a capacitor which is subject to decrease in capacitance at low temperatures in which the effective value of the capacitance is increased when the ambient temperature falls below a predetermined value. This may be done in various ways. In one embodiment of the invention, a thermostat, or other type of temperature responsive switch, is used to change the taps on an auto-transformer and thus compensate for the decrease in capacitance by increasing the effective value in the circuit of the motor winding when the actual capacitance decreases because of low temperature, so that the effective value in the motor circuit remains substantially the same and satisfactory performance of the motor is obtained at any temperature. The same result may also be accomplished by using a temperature responsive switch to connect an additional capacitor unit in the motor circuit when the temperature falls below a predetermined value, so that the resultant capacitance will be increased sufficiently to restore it to the desired value. Other suitable arrangements might also be used for increasing the effective or resultant capacitance when the temperature falls below a predetermined point so as to maintain the proper value of capacitance in the motor circuit to obtain satisfactory operation.

The invention will be more fully understood from the following detailed description, taken in connection with the accompanying drawing, in which:

Figure 1 is a wiring diagram showing a capacitor motor embodying the invention; and Fig. 2 is a similar diagram showing another embodiment of the invention.

Fig. 1 shows a capacitor motor 1, of any suitable or usual construction, which has a rotor member 2, preferably provided with a squirrel-cage secondary winding indicated at 3, and having a main primary winding 4 and an auxiliary or capacitor primary winding 5 placed on the stator frame of the motor and displaced from each other approximately 90 electrical degrees. The main winding 4 is connected directly across a single-phase supply line 6 through a line switch 7. The auxiliary winding 5 is also connected across the line 6 in parallel with the winding 4 through an auto-transformer 8 and a centrifugal or other type of speed responsive switch 9. A capacitor 10 is connected across the auto-transformer in order to produce a phase displacement between the currents in the windings 4 and 5. The effective value of capacitance introduced into the circuit of the winding 5 in this way is dependent on the voltage applied to the capacitor by the auto-transformer 8. In order to vary this voltage, the auto-transformer is provided with taps 11, 12 and 13. When the motor is starting, the centrifugal switch 9 connects one of the taps 11 or 12 to the line 6 through its contacts 14, in order to apply a relatively high voltage to the capacitor 10. After the motor has reached a predetermined speed, the switch 9 throws over to the contacts 15 and connects the tap 13 of the auto-transformer to the line 6 to apply a lower voltage to the capacitor for the most desirable running condition.

The capacitor 10 may be of any usual construction, but is preferably made with an impregnating liquid such as chlorinated diphenyl, which, as described above, gives it very desirable characteristics, but which makes it subject to a marked decrease in capacitance when the temperature of the capacitor falls below a definite value. In order to overcome this difficulty, the present invention provides means for increasing the effective value of the capacitance supplied to the motor circuit to compensate for the decreased capacitance of the capacitor 10 when the temperature falls below this value. Thus, as shown in Fig. 1, the auto-transformer 8 has two taps 11 and 12 which are connected to contacts 16 and 17, respectively. A temperature responsive switch 18 is provided which is preferably of the thermostatic type, having a bimetallic element 19 which actuates the switch so that it connects the contact 16 to the speed responsive switch 9 when the temperature is above a predetermined value, such as 25° F., and connects the contact 17 to the switch 9 when the temperature falls below that value. It will be seen that in this way a higher voltage is applied to the capacitor 10 when the ambient temperature falls to a value at which the capacitance decreases. By applying a higher voltage, the decrease in capacitance is compensated and the effective capacitance in the motor circuit remains substantially the same. The temperature responsive switch 18 may be relatively small and inexpensive and can be mounted on the motor adjacent the capacitor and auto-transformer so that it is subjected to the same ambient temperature. By using this arrangement, therefore, it is possible to use the most desirable type of capacitor with a motor which is intended for intermittent or occasional service in locations where low ambient temperatures are likely to be encountered without causing unsatisfactory performance of the motor because of the change in capacitance of the capacitor.

Another embodiment of the invention is shown in Fig. 2. In this figure the motor 1 is identical with the motor described above in connection with Fig. 1 and its windings 4 and 5 are connected to the single-phase supply line 6 in the same manner. In this embodiment of the invention, however, the auto-transformer 8 has only two taps 20 and 21, which correspond to the taps 12 and 13, respectively of Fig. 1. The centrifugal switch 9 operates, as previously described, to connect the tap 20 to the line for starting the motor, and connects the tap 21 to the line for running after the motor has reached the predetermined speed.

In this embodiment of the invention, a capacitor 22, similar to the capacitor 10, is connected across the auto-transformer 8. The capacitor 22 has the proper value of capacitance to obtain the desired performance of the motor at normal temperatures. In order to compensate for the decrease in capacitance of the capacitor 22 at low temperatures, a second capacitor 23 is provided which preferably has a capacitance at low temperatures approximately equal to the decrease in capacitance of the capacitor 22 when the temperature drops below the point at which the dielectric constant of the impregnating liquid begins to decrease. This value is usually about 25% of the rated capacitance of the capacitor 22. A temperature responsive switch 24 is provided to connect the capacitor 23 in the circuit when the temperature falls below a predetermined value. As before, this switch is preferably of the thermostatic type, having a bimetallic element 25 which operates to close the switch contacts 26 when the temperature falls below a predetermined value, such as 25° F., and thus connect the capacitor 23 in parallel with the capacitor 22. It will be seen that the resultant value of capacitance connected in the motor circuit will always be the same regardless of temperature, since when the temperature falls to a point where the capacitance of the capacitor 22 is decreased, the capacitor 23 is automatically connected and the resultant capacitance in the motor circuit is then substantially the same as it was before, so that satisfactory performance of the motor is obtained under all conditions of temperature It should now be apparent that a relatively simple means has been provided for compensating for the change in capacitance of a capacitor at low temperatures, so that capacitors of this type may be used satisfactorily with motors intended for intermittent or occasional operation in locations where low temperatures are likely to prevail. The invention may readily be adapted for use with any of the well known types of capacitor motors and its usefulness is not restricted to the particular type of motor selected for the purpose of illustration. It will also be obvious that the invention is not limited to the particular arrangements shown, but that various other equivalent arrangements might be used to automatically effect an increase in the effective or resultant capacitance connected in the motor circuit to compensate for the decrease in actual capacitance when the temperature falls below a certain point.

It is to be understood, therefore, that although certain specific embodiments of the invention have been illustrated and described, it is not limited to the exact arrangements shown, but in its broadest aspects it includes all equivalent modifications and embodiments which come within the scope of the appended claims.

I claim as my invention:

1. A single phase induction motor having a main primary winding and an auxiliary primary winding, a capacitor connected to the auxiliary winding for causing a phase displacement between the currents in the main and auxiliary windings, said capacitor being of a type in which the capacitance decreases at low temperatures, and means for increasing the voltage across the capacitor when the ambient temperature falls below a predetermined point, whereby the effective capacitance in the circuit of the auxiliary winding is maintained substantially unchanged.

2. A single phase induction motor having a main primary winding and an auxiliary primary winding, a capacitor connected to the auxiliary winding for causing a phase displacement between the currents in the main and auxiliary windings, said capacitor being of a type in which the capacitance decreases at low temperatures, and temperature responsive means for increasing the voltage across the capacitor when the ambient temperature falls below a predetermined point, whereby the effective capacitance in the circuit of the auxiliary winding is maintained substantially unchanged.

3. A single phase induction motor having a main primary winding and an auxiliary primary winding, a capacitor connected to the auxiliary winding for causing a phase displacement between the currents in the main and auxiliary windings, said capacitor being of a type in which the capacitance decreases at low temperatures, transformer means connected in series with said auxiliary winding, said capacitor being connected across the transformer means, and means for increasing the voltage applied to the capacitor by the transformer means when the ambient temperature falls below a predetermined value.

4. A single phase induction motor having a main primary winding and an auxiliary primary winding, a capacitor connected to the auxiliary winding for causing a phase displacement between the currents in the main and auxiliary windings, said capacitor being of a type in which the capacitance decreases at low temperatures, transformer means connected in series with said auxiliary winding, said capacitor being connected across the transformer means, speed responsive means for connecting the transformer means to apply one voltage to the capacitor for starting the motor and a different voltage after the motor has reached a predetermined speed, and means for increasing the voltage applied to the capacitor during starting when the ambient temperature falls below a predetermined value.

5. A single phase induction motor having a main primary winding and an auxiliary primary winding, a capacitor connected to the auxiliary winding for causing a phase displacement between the currents in the main and auxiliary windings, said capacitor being of a type in which the capacitance decreases at low temperatures, transformer means connected in series with said auxiliary winding, said capacitor being connected across the transformer means, speed responsive means for connecting the transformer means to apply one voltage to the capacitor for starting the motor and a different voltage after the motor has reached a predetermined speed, and a temperature responsive tap-changing switch for increasing the voltage applied to the capacitor during starting when the ambient temperature falls below a predetermined value.

6. A single phase induction motor having a main primary winding and an auxiliary primary winding, a capacitor connected to said auxiliary winding for causing a phase displacement between the currents in the main and auxiliary windings, said capacitor being of a type in which the capacitance decreases at low temperatures, and means for supplying additional capacitance in the circuit of said auxiliary winding when the ambient temperature falls below a predetermined value.

7. A single phase induction motor having a main primary winding and an auxiliary primary winding, a capacitor connected to said auxiliary winding for causing a phase displacement between the currents in the main and auxiliary windings, said capacitor being of a type in which the capacitance decreases at low temperatures, and temperature responsive means for supplying additional capacitance in the circuit of said auxiliary winding when the ambient temperature falls below a predetermined value.

8. A single phase induction motor having a main primary winding and an auxiliary primary winding, a capacitor connected to said auxiliary winding for causing a phase displacement between the currents in the main and auxiliary windings, said capacitor being of a type in which the capacitance decreases at low temperature, a second capacitor, and means for connecting the second capacitor in parallel with the first mentioned capacitor when the ambient temperature falls below a predetermined value.

9. A single phase induction motor having a main primary winding and an auxiliary primary winding, a capacitor connected to said auxiliary winding for causing a phase displacement between the currents in the main and auxiliary windings, said capacitor being of a type in which the capacitance decreases at low temperatures, a second capacitor and temperature responsive switch means for connecting the second capacitor in parallel with the first mentioned capacitor when the ambient temperature falls below a predetermined value.

10. A single-phase induction motor having a main primary winding and an auxiliary primary winding, a rotor member having a secondary winding thereon, capacitive means for producing a phase displacement between the currents in said main and auxiliary primary windings, said capacitive means being of a type which is subject to decrease in capacitance at low temperatures, circuit connections for connecting the capacitive means in the circuit of the auxiliary winding, other circuit connections for connecting the capacitive means in the circuit of the auxiliary winding with relatively increased effective capacitance, and temperature responsive means for rendering said last mentioned circuit connections operative when the temperature falls below a predetermined value, the resulting increase in effective capacitance in the auxiliary winding circuit being enough to substantially compensate for the decrease in capacitance at low temperature.

RALPH E. MARBURY.